Aug. 18, 1970     R. P. BURR     3,524,251
METHOD OF MANUFACTURING DISC-TYPE WIRE WOUND ELECTRICAL MACHINES
Original Filed Dec. 6, 1965     8 Sheets-Sheet 2

INVENTOR.
ROBERT P. BURR

Aug. 18, 1970 R. P. BURR 3,524,251
METHOD OF MANUFACTURING DISC-TYPE WIRE WOUND ELECTRICAL MACHINES
Original Filed Dec. 6, 1965 8 Sheets-Sheet 3

INVENTOR.
ROBERT P. BURR

INVENTOR.
ROBERT P. BURR

INVENTOR.
ROBERT P. BURR

Aug. 18, 1970  R. P. BURR  3,524,251
METHOD OF MANUFACTURING DISC-TYPE WIRE WOUND ELECTRICAL MACHINES
Original Filed Dec. 6, 1965  8 Sheets-Sheet 6
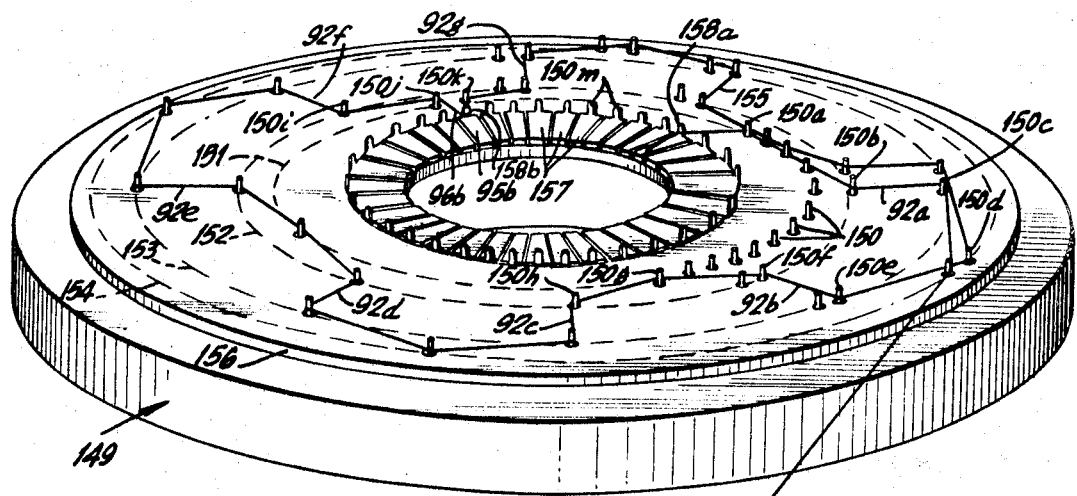
FIG. 12
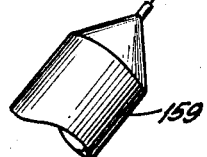
FIG. 13A
FIG. 14
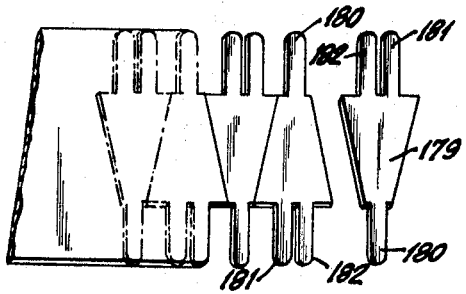
FIG. 13B
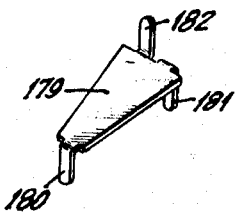
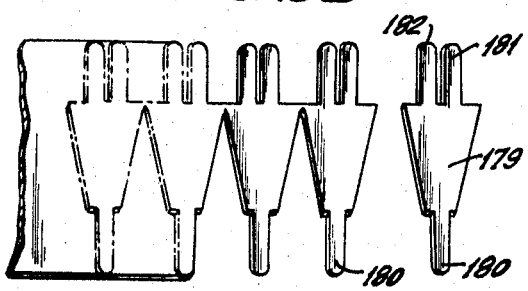
FIG. 13C
*INVENTOR.*
ROBERT P. BURR

Aug. 18, 1970 R. P. BURR 3,524,251
METHOD OF MANUFACTURING DISC-TYPE WIRE WOUND ELECTRICAL MACHINES
Original Filed Dec. 6, 1965 8 Sheets-Sheet 7

INVENTOR.
ROBERT P. BURR

Aug. 18, 1970 R. P. BURR 3,524,251
METHOD OF MANUFACTURING DISC-TYPE WIRE WOUND ELECTRICAL MACHINES
Original Filed Dec. 6, 1965 8 Sheets-Sheet 8

INVENTOR.
ROBERT P. BURR

United States Patent Office 3,524,251
Patented Aug. 18, 1970

3,524,251
METHOD OF MANUFACTURING DISC-TYPE WIRE WOUND ELECTRICAL MACHINES
Robert P. Burr, Huntington, N.Y., assignor to Circuit Research Company, Glen Cove, N.Y., a partnership of New York
Original application Dec. 6, 1965, Ser. No. 511,608. Divided and this application Apr. 8, 1968, Ser. No. 736,873
Int. Cl. H02k 15/02
U.S. Cl. 29—598         18 Claims

ABSTRACT OF THE DISCLOSURE

This invention relates to methods of constructing disc armatures wherein wire is distributed on a planar surface in a continuous fashion such that said wire forms an armature winding.

---

This invention relates to electrical machines and more particularly to direct current machinery having wire wound disc armatures.

This application is a division of my co-pending application Ser. No. 511,608 filed Dec. 6, 1965.

During the past decade considerable work has been done in developing motors which could be constructed economically using printed circuit techniques. For example, see Pat. No. 3,144,574 issued Aug. 11, 1964, to J. Henry-Baudot and No. 3,171,051 issued Feb. 23, 1965, to Robert P. Burr. The direct current machines which emerged from this development include a disc armature with half of each armature turn placed on one side of a dielectric disc and the other half of each turn placed on the reverse side. By using this technique, the entire armature can be placed on the surface of a disc without crossing conductors.

The printed circuit machines have not become universal replacements for conventional motors and generators but instead have developed a market of their own because of several unique characteristics. Some of the more outstanding features of this new disc-type machine are the low inertia of the armature, the lack of preferred armature position, the absence of cogging, and the relatively smooth and linear torque characteristics.

The necessity of having armature conductors on both sides of a dielectric disc, as is universal in printed circuit type machines, is a decided disadvantage since it requires a large number of through connections in order to interconnect the conductors. The number of production steps required in first forming the individual conductors on the surfaces of a dielectric disc, and in then making the large number of required through connections, results in a relatively expensive armature. Furthermore, each different size and type of machine required precision tools and dies, and hence, there ise only limited flexibility in the design of these machines if economical production is to be achieved.

A disc-type machine does not normally include iron in the rotating armature structure, and hence, the working air gap of the machine must be sufficient to accommodate the armature winding. The performance of the machine will vary approximately as the square of the flux density in the working air gap and, therefore, it is desirable to minimize the length of the air gap and the thickness of that portion of the armature within the air gap. With the printed type armature, conductors are located on both sides of a dielectric disc and therefore the minimum thickness of the armature within the air gap is twice that of an individual conductor. Furthermore, the copper thickness must be fairly uniform over the entire surface of the disc, and hence, the designer cannot vary the copper density as desired to optimize performance.

It is an object of this invention to provide a wire wound disc type electrical machine possessing the desirable characteristics of the disc-type machines and at the same time eliminating the aforementioned disadvantages.

It is another object to provide a disc-type armature having no through connections, and a method for making such an armature.

It is another object to provide a disc-type armature which can be constructed having only a single layer of conductors within the working air gap of the machine, and a method of making the same.

A further object is to provide an armature for a disc-type machine and a method for constructing the same wherein the copper density can be varied as desired to minimize the diameter of the armature.

Still another object is to provide a low cost disc-type machine which can readily be made in an unlimited variety of different forms by means of automatic machinery with a minimum number of production steps.

These and other objects will become apparent from the following specification which described several illustrative embodiments of the invention. Although these descriptions refer principally to DC motors, it should be kept in mind that the same is generally applicable to generators and some AC machinery as well. The drawings form part of this specification wherein.

Figure 7:
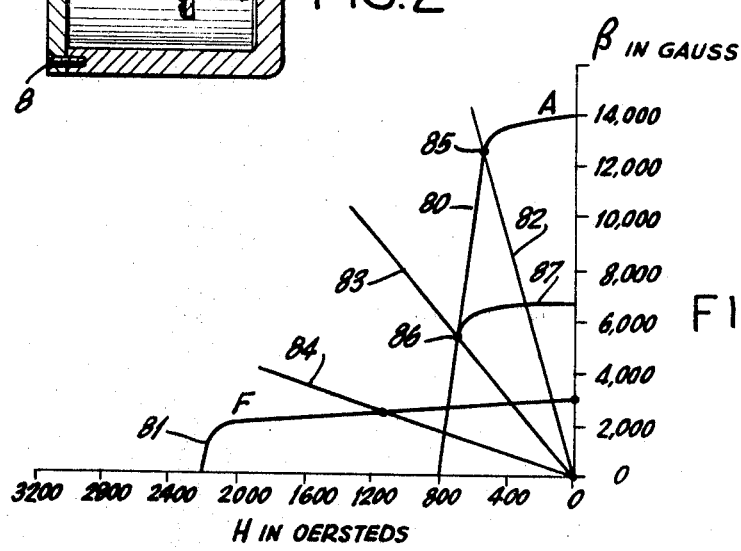
Figure 8:
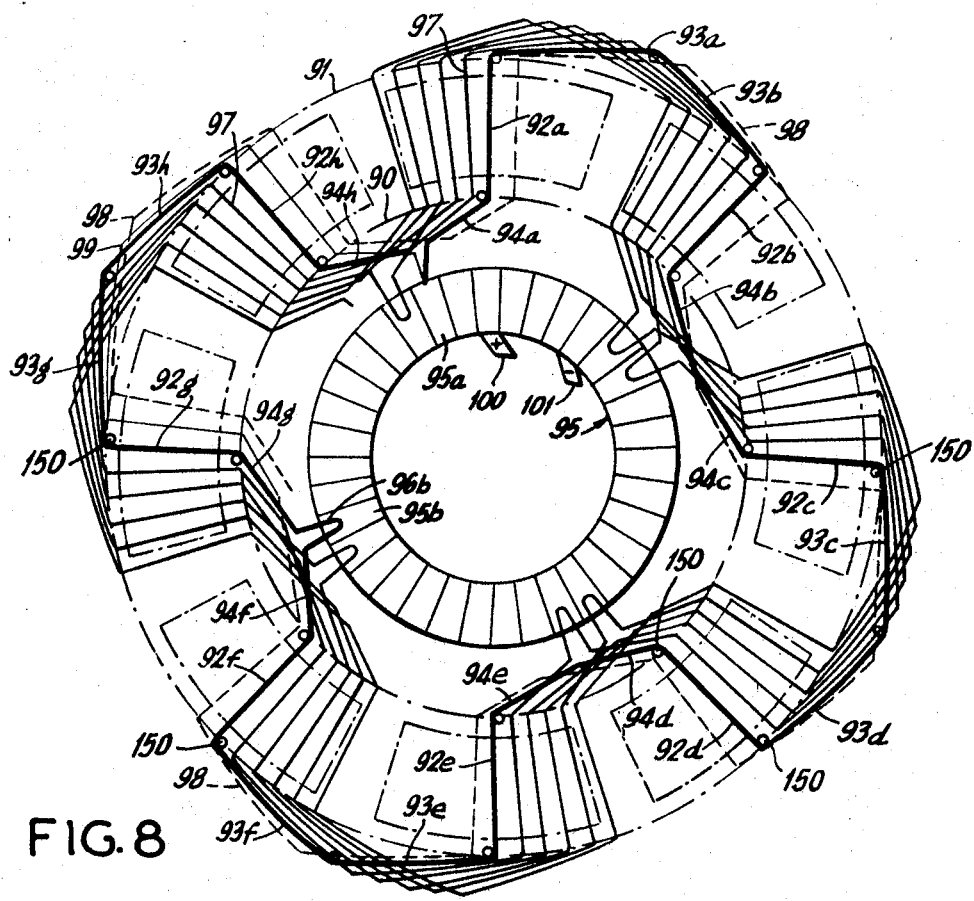
Figure 10:
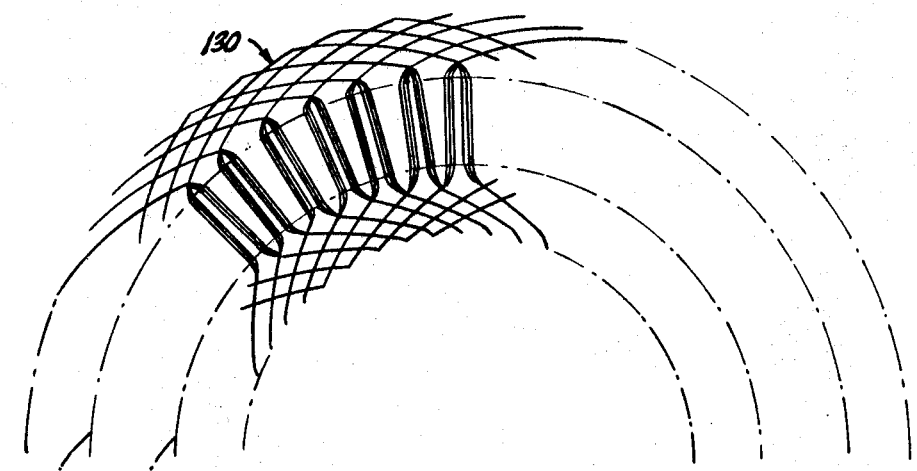
Figure 9:
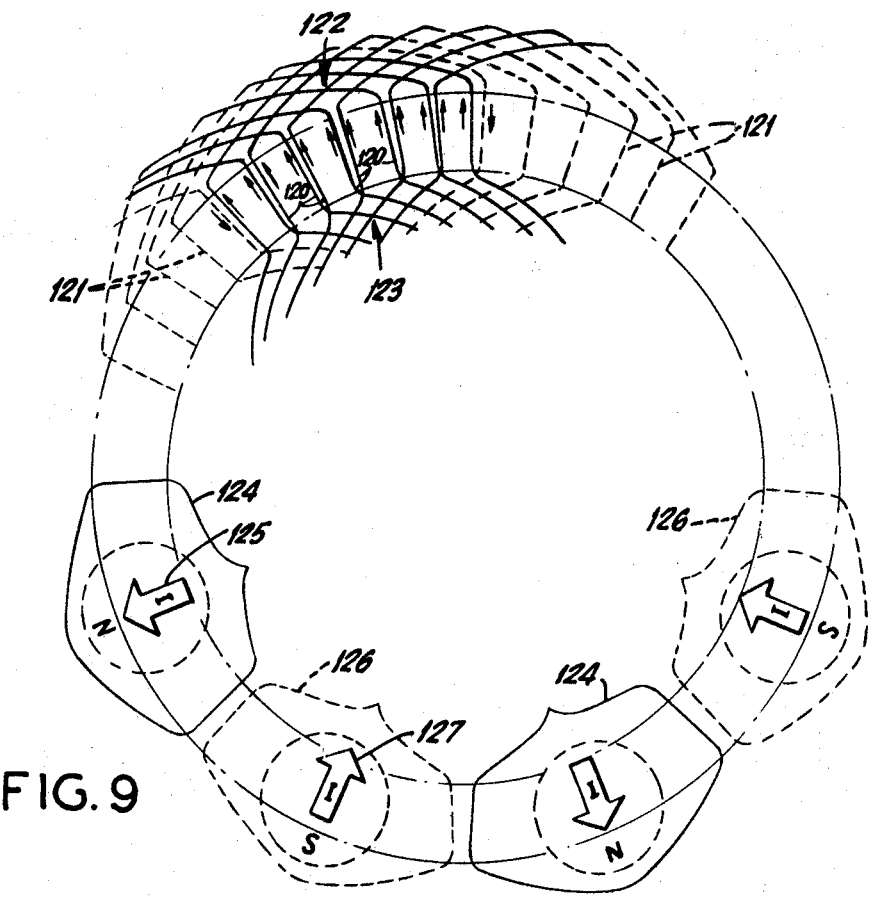
Figure 11:
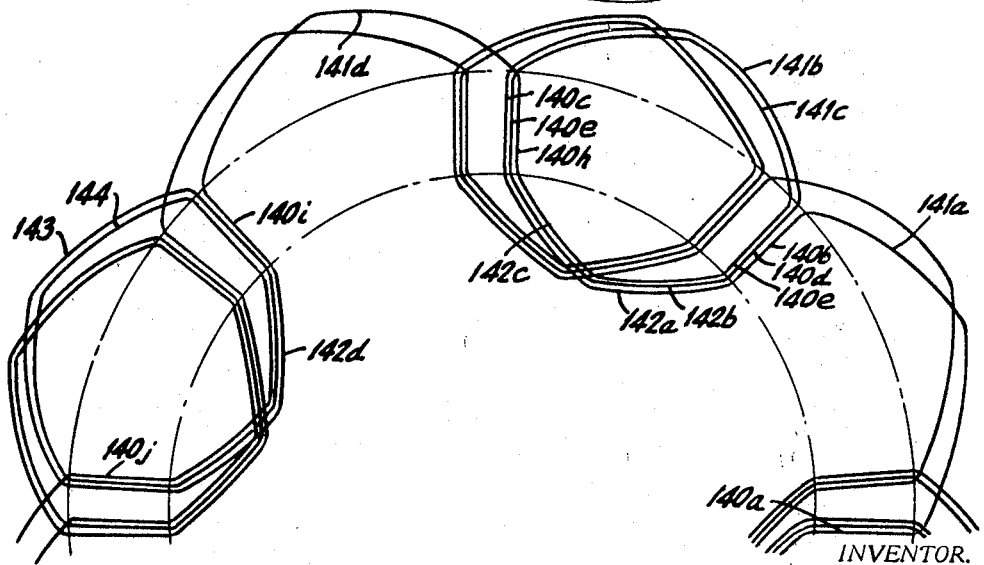
Figure 15A:
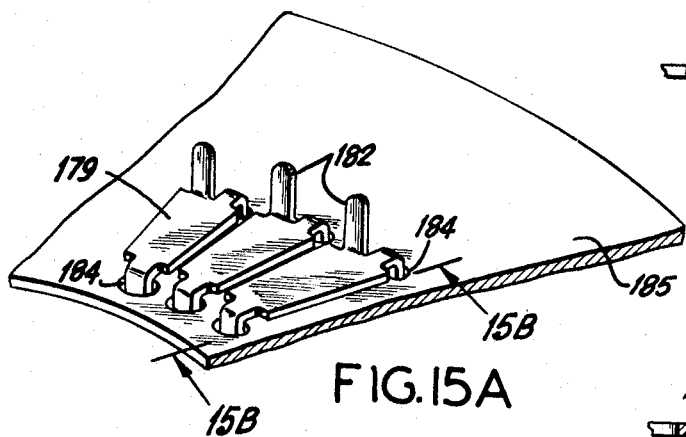
Figure 15B:
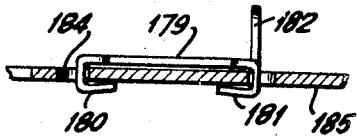
Figure 15C:
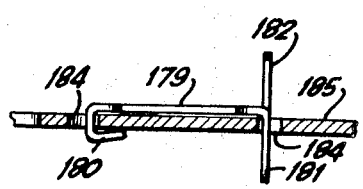
Figure 16B:
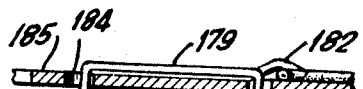
Figure 16A:
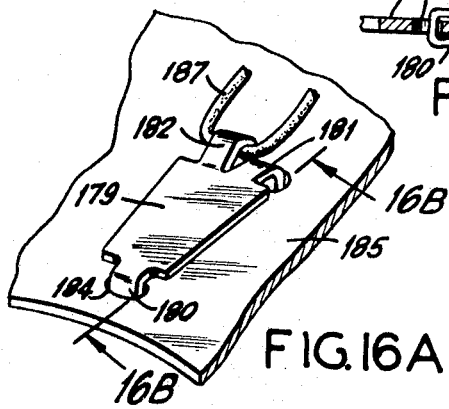
Figure 17A:
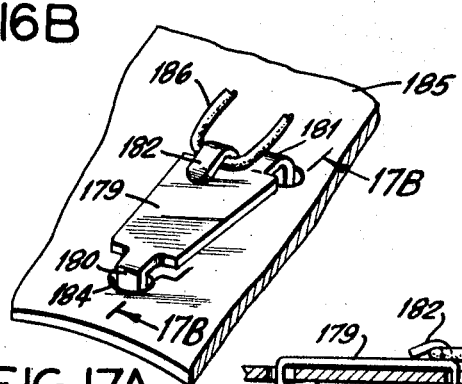
Figure 17B:
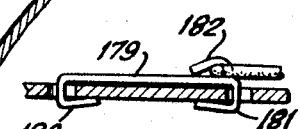
Figure 18:
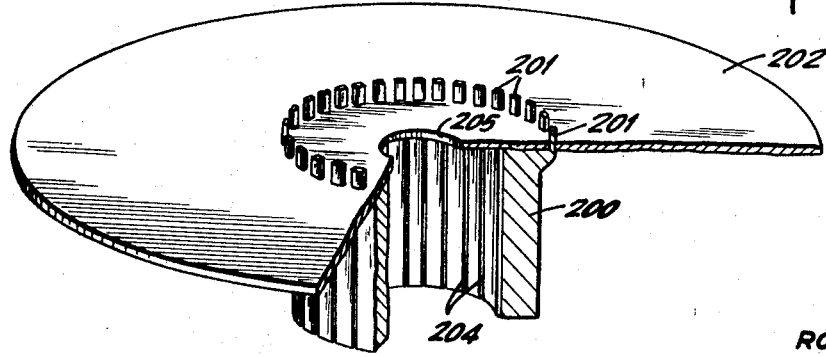
Figure 19A:
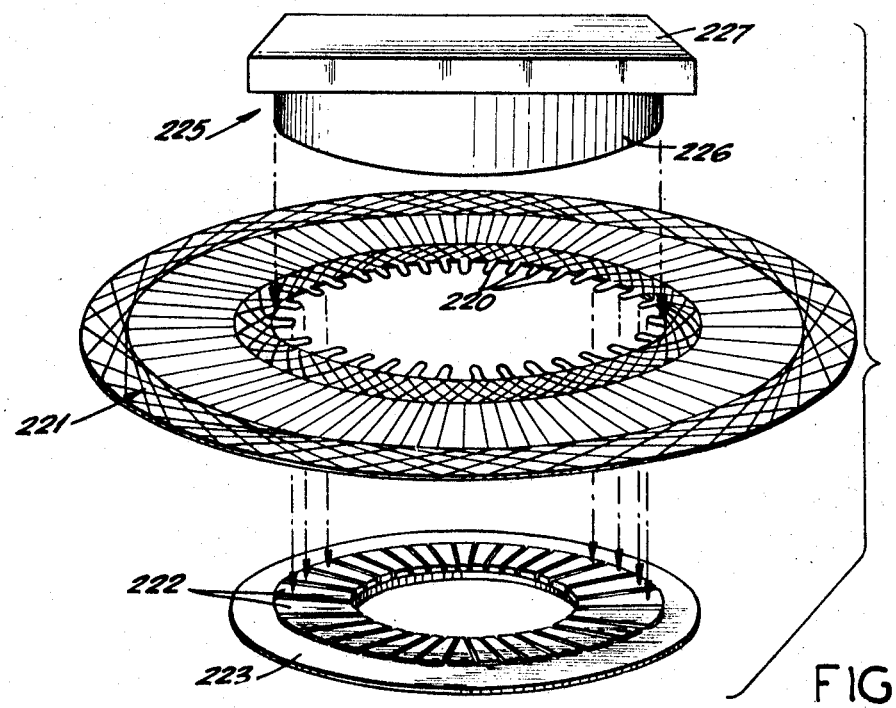
Figure 19B:
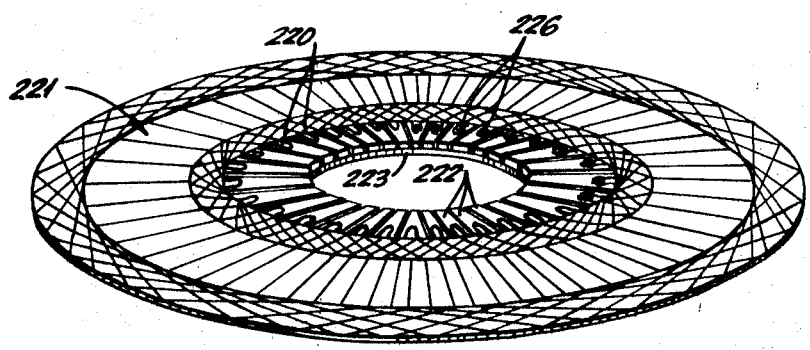
Figure 20A:
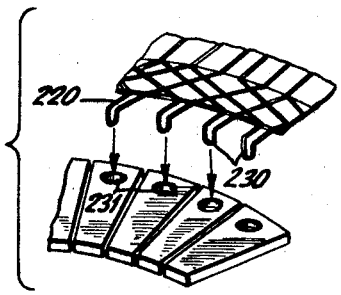
Figure 20B:
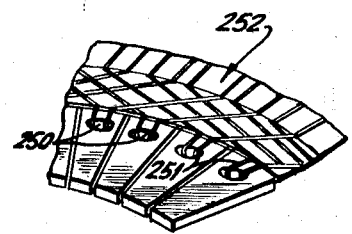

FIG. 7 graphically illustrates the approximate demagnetization curves for several permanent magnet materials;

FIG. 8 is a plan view of the disc armature including the first armature loop of the winding in bold outline for clarity of illustration;

FIG. 9 is a partial plan view of an armature winding illustrating the relative directions of current flow in the winding;

FIG. 10 is a partial plan view of a multistrand armature winding;

FIG. 11 is a partial plan view of a combined lap-wave armature winding;

FIG. 12 is a perspective view illustrating a method of winding an insulated wire armature;

FIGS. 13A–13C illustrate a method for obtaining commutator segments from copper blanks;

FIG. 14 is a perspective view of a preformed commutator segment;

FIGS. 15A–15C are views illustrating the commutator segments secured to a dielectric support disc;

FIG. 16A and 16B are perspective and cross-sectional views respectively illustrating one method of attaching the commutator connection loops to a commutator segment;

FIGS. 17A and 17B are perspective and cross-sectional views respectively illustrating another method of attaching the commutator connection loops to a commutator segment;

FIG. 18 is a perspective view of a cylindrical commutator attached to a dielectric disc with portions broken away for clarity of illustration;

FIGS. 19A and 19B are perspective assembly diagrams illustrating a method of connecting a prewired armature to a printed circuit type commutator; and FIGS. 20A and 20B are perspective assembly diagrams illustrating methods of attaching an armature winding to a printed circuit type commutator having apertures in the commutator segments.

GENERAL DESCRIPTION

Figure 1:
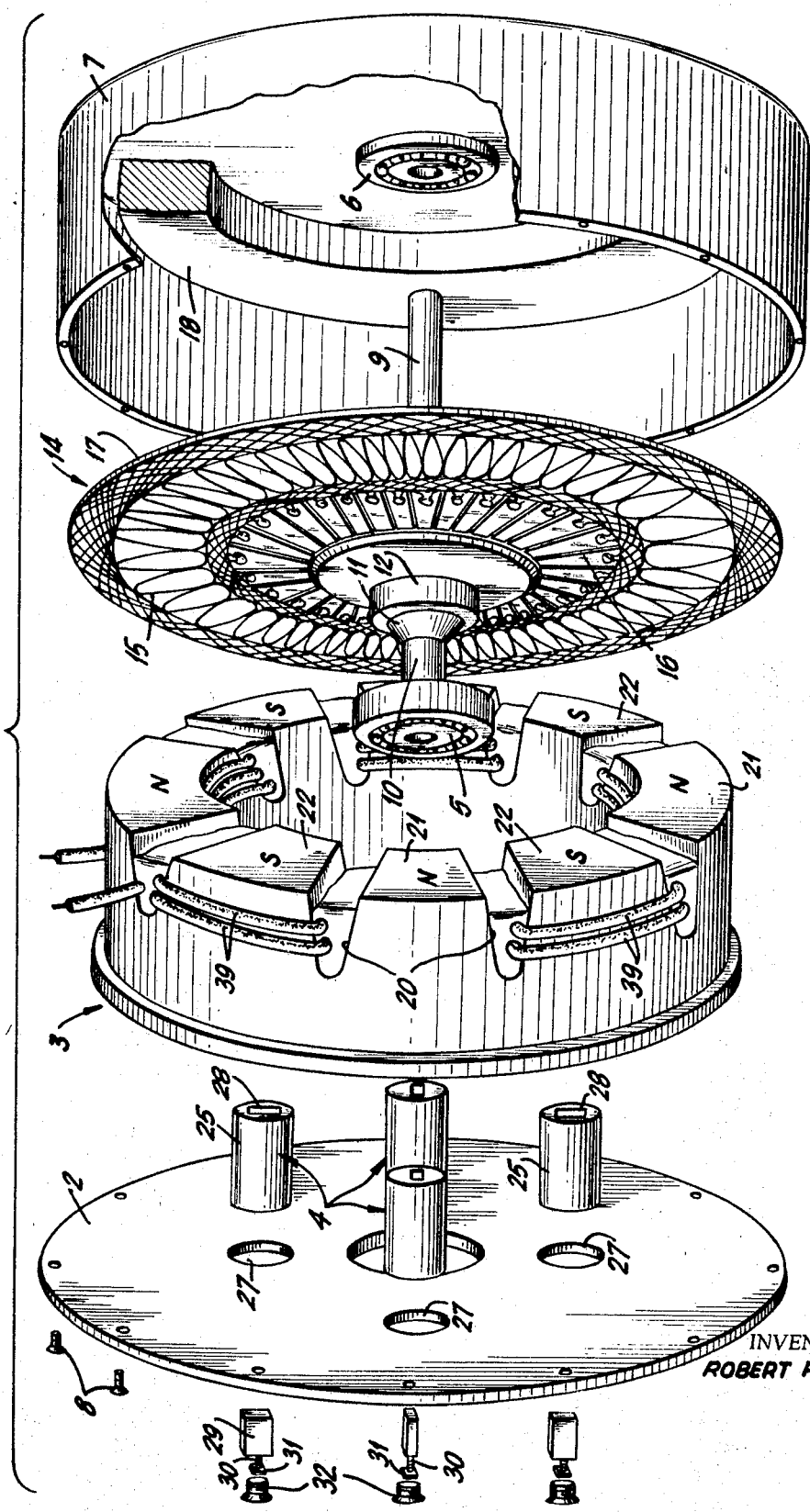
FIG. 1 is an exploded perspective assembly drawing illustrating a high performance wire wound disc-type motor with an integral multipole permanent magnet structure.
Figure 2:
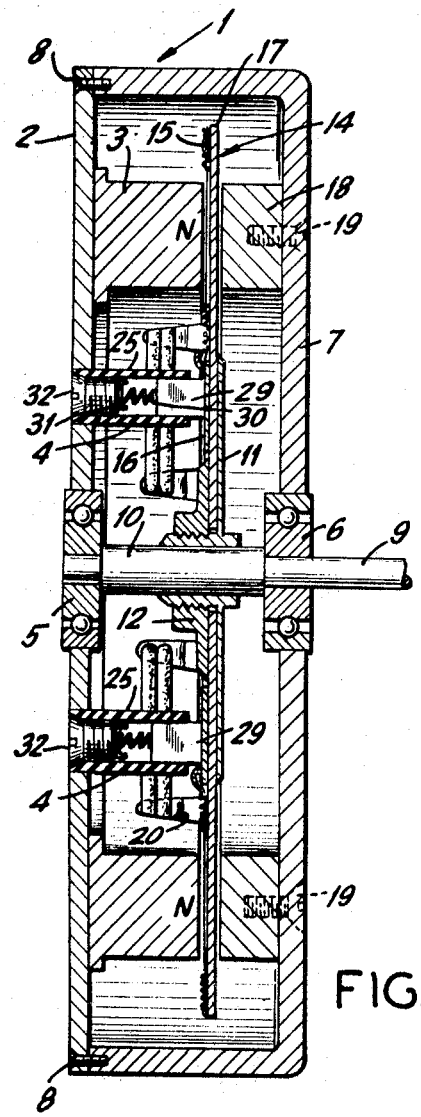
FIG. 2 is a cross-sectional view of the assembled motor illustrated in FIG. 1.

An insulated wire wound disc type motor in accordance with one embodiment of this invention is shown in FIGS. 1 and 2. The motor is enclosed within a two-part housing 1 including a base plate 2. A stationary permanent magnet structure 3, brush holders 4 and one of the bearings 5 are mounted on the base plate. The other bearing 6 is mounted within a central opening in the cup-shaped member 7 forming the other part of the motor housing, member 7 being secured to the base plate at its periphery by means of screws 8.

The motor shaft 9 is journaled in bearings 5 and 6, and includes an intermediate section 10 of increased diameter. The increased diameter section is positioned between the bearings and prevents axial movement of the shaft. The motor armature 14 is mounted on shaft 9 by means of a flanged hub 11 rigidly secured to the shaft and an associated flanged nut 12 which cooperates with the external threads on the shank portion of the hub. The dielectric disc 17 forming part of armature 14 is rigidly secured between the flanges of nut 12 and hub 11.

The armature which will be described in greater detail hereinafter, includes an armature winding 15 which may be supported by a dielectric disc 17 shown adjacent the winding for illustration purposes. The commutator segments 16 are centrally located with respect to the winding and are shown secured to dielectric disc 17. The flange of hub 11 provides structural backing for the commutator to prevent distortion of the armature disc due to the force exerted against the commutator by the brushes.

The motor illustrated in FIGS. 1 and 2 is an eight pole motor and therefore the permanent magnet structure 3 is divided into eight segments which provide the necessary pole faces. The permanent magnet structure is a unitary ring-shaped member provided with slots 20 which define individual bosses that form an annular array of the pole faces lying in a plane perpendicular to the axis of rotation. The magnetic structure is a cast or sintered unit fashioned from a nickel-aluminum-cobalt alloy such as alnico. The structure is magnetized to provide pole faces of alternating magnetic polarities. A ring 18 of soft iron is secured to the rear of the housing by screws 19 to complete the magnetic path between adjacent pole faces. The space between ring 18 and the pole face surfaces is the working air gap of the machine and must be sufficient to accommodate the armature and provide a working clearance. Permanent magnet structure 3 is secured to base plate 1.

As will be explained later in greater detail, the radially extending segments of the armature winding lie within the working air gap adjacent the pole faces. The thickness of the position of the armature winding within the air gap is maintained at a minimum. The thicker portions of the winding which include the crossover connections are located outside the air gap.

Brush holders 4 each include an insulated sleeve having a cylindrical body portion 25, the end of which extends through suitable openings 27. The brushes 29 are rectangular in cross section and extend from the brush holders through suitably dimensioned rectangular openings 28. The end of the brush holder opposite the rectangular opening is internally threaded and adapted to receive a flat head screw 32. When the screw is inserted, pressure is applied to the brush via a spring 30 and small pressure plate 31, so that the brush is maintained in engagement with commutator segments 16. The number of brushes and the placement relative to the pole faces varies in accordance with the armature winding and current carrying requirements.

Figure 3:
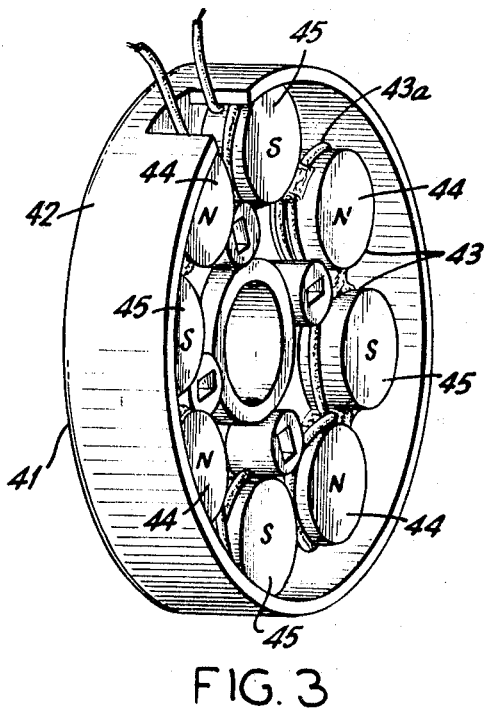
FIG. 3 is a perspective view illustrating a stator structure for a high performance disc-type machine having individual permanent magnet slugs.
Figure 4:
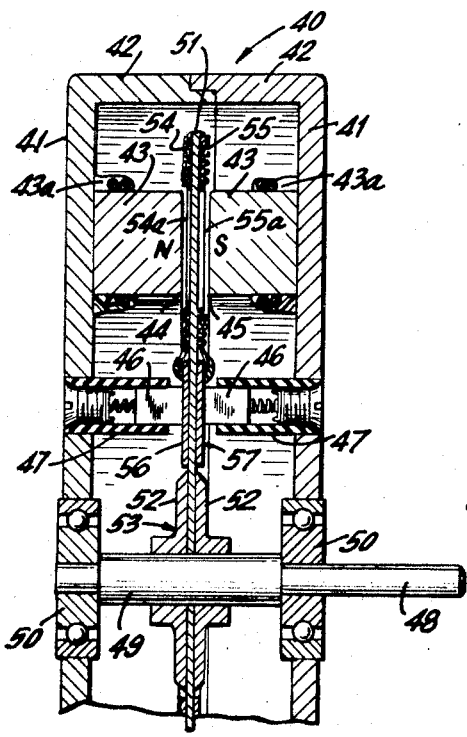
FIG. 4 is a cross-sectional view of a disc-type motor incorporating a pair of stators of the type illustrated in FIG. 3.

A motor in accordance with another illustrative embodiment is shown in FIGS. 3 and 4. The motor housing 40 consists of two substantially identical parts as shown in FIG. 3, each including a circular base plate 41 and a cylindrical portion 42 being integral with the base plate. The motor is an eight pole motor and therefore eight cylindrical slugs 43 of an aluminum-nickel-cobalt alloy material such as alnico are secured to the base plate. These slugs are evenly distributed to form an annular array of pole faces and are each secured to the base plate by means of an adhesive such as epoxy cement. When the assembly of the motor is completed, slugs 43 will be magnetized to provide pole faces 44 and 45 of alternating north and south magnetic polarities.

The brushes 46 and brush holders 47 are similar to those previously described in FIG. 1 and are mounted within suitable openings in base plate 41. The number of brushes and the positions relative to the magnetic poles depends upon the type of armature winding.

The free edges of cylindrical portions 42 of the housing are machined to provide cooperating flanges so the two parts of the housing can be accurately positioned relative to one another. The permanent magnet slugs are aligned so that when magnetized north pole faces 44 will be opposite south pole faces 45. The space between the pole faces is the working air gap of the motor which must be sufficient to accommodate the armature windings.

The motor shaft 48 includes an increased diameter section 49 positioned between a pair of ball bearings 50 to prevent axial movement. The bearings are secured within centrally located openings in base plates 41. A dielectric support disc 51 is securely fastened to shaft 48 between flanges 52 of a hub structure 53. Two separate armature windings 54 and 55 are placed on opposite sides of the disc with their respective commutators 56 and 57 located between the windings and flanges of hub 53. With a commutator on each side of the disc, the forces exerted by the brushes on one side of the disc are counterbalanced by forces created by the brushes bearing upon the commutator on the other side of the disc.

The armature windings 54 and 55 can be the same and thereby provide a machine of increased capacity. As an alternative, one winding can be used to form a motor and the other winding can form a tachometer generator. In either case, the insulated wire forming the windings is distributed to minimize thickness in the area of the radially extending segments 54a and 55b, since these portions of the winding lie within the working air gap of the machine. The radially extending segments are shown in FIG. 4 as lying on the surfaces of dielectric disc 51, but in actual practice these segments would be located within the dielectric support disc if such a disc is used and, hence, the thickness of the armature adjacent the magnetic pole faces need not exceed the diameter of the insulated wire forming the winding. The thicker portions of the armature winding which include the crossover connections are located outside the working air gap.

Figure 5:
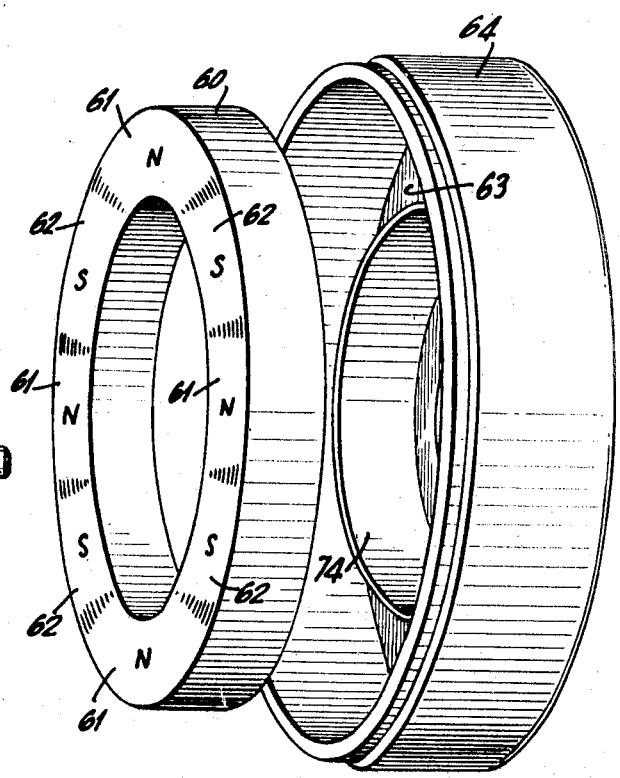
FIG. 5 is a perspective view illustrating a stator structure for a disc-type machine having a ring type permanent magnet structure.

A third type of stator structure is shown in FIG. 5. The permanent magnet structure consists of ferrite ring 60 which is selectively magnetized so that alternate north and south pole faces, 61 and 62 respectively, appear on one of the planar surfaces. The ferrite ring is secured to a base plate 63 of the associated housing surrounding a suitably dimensioned annular flange 74 by means of an adhesive like epoxy cement. Integral with the circular base plate is an outer cylindrical shell 64.

Figure 6:
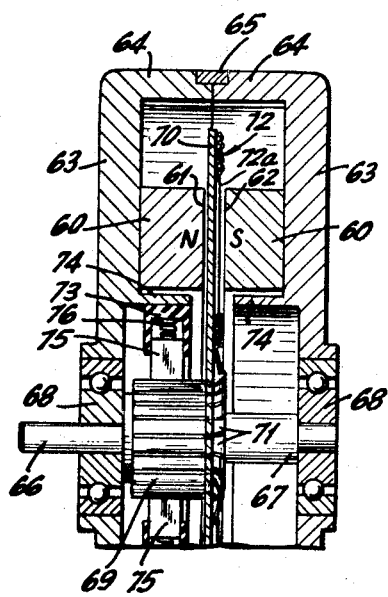
FIG. 6 is a cross-sectional view of a disc-type motor incorporating a pair of stators of the type illustrated in FIG. 5 and a cylindrical commutator.

A pair of stator structures, each including a ferrite permanent magnet ring, can be combined to form a motor as illustrated in FIG. 6. The free deges of the cylindrical portions of the housing are carefully machined to assure proper alignment and spacing of the permanent magnet rings. The portions of the housing are maintained in position by a surrounding alignment ring 65. The ferrite rings are orientated so that the north pole faces 61 are opposite the south pole faces 62.

The motor shaft 66 includes an increased diameter section 67 located between a pair of ball bearings 68 to prevent axial movement of the shaft and armature. A cylindrical commutator 69 is securely mounted upon shaft 66, preferably including an insulating sleeve between the conductive segments and the shaft. A dielectric support disc 70 is mounted abutting one end of the commutator with tabs 71 from the individual commutator segments passing through suitable holes for connection to the winding on the opposite side. Insulated wire is distributed to form a winding 72 having radially extending segments 72a lying within the working air gap between the magnetic pole faces, and crossover connections lying outside the air gap. Preferably, the winding lies within the dielectric medium to minimize the armature thickness within the air gap instead of adjacent the dielectric as shown in FIG. 6.

The brush holders 73 are mounted on the cylindrical inner surface of flange 74. The brush holders are constructed from a nonconducting material and include a slot dimensioned to accommodate the brushes 75 having rectangular cross sections. The brushes are urged into engagement with the cylindrical surface of the commutator by springs 76 located within the brush holders.

Although the machines in FIGS. 1–6 have been described primarily as motors, it should be noted that the units are also operable as generators, and hence, the teachings within the specification are also applicable to generators. Furthermore, FIGS. 1–6 are descriptive of various features within the scope of this invention which need not be combined in the manner illustrated. For example, anyone of the machines can include an array of permanent magnets on both sides of the air gap as shown in FIGS. 4 and 6, or on one side of the air gap only as shown in FIG. 2. The commutators can be of the disc type shown in FIGS. 2 and 4, or of the cylindrical type shown in FIG. 6. The machines can have a single armature winding as shown in FIGS. 2 and 6, or can have multiple windings as shown in FIG. 4. The descriptions are also applicable to some types of AC machinery wherein the commutator is replaced by suitable slip rings, and to DC generators wherein the commutator is replaced by the equivalent arrangement comprising slip rings and rectifying semiconductor diodes.

METHOD OF MAGNETIZING PERMANENT MAGNETS

When considering the operating characteristics of permanent magnets, the demagnetization curves such as are illustrated in FIG. 7 should be examined. The vertical axis in FIG. 7 represents $\beta$ in gauss and the horizontal axis represents H in oersteds. Curve 80 is the approximate demagnetization curve for aluminum-nickel-cobalt alloy materials known as alnico whereas curve 81 is an approximate demagnetization curve of material like barium ferrite. Diagonal lines 82, 83 and 84 represent three possible magnetic load lines each representative of a different permeance coefficient. The permeance coefficient is approximately proportional to the ratio of the magnet length to the length of the associated air gap. If there is no air gap in the magnetic loop, the load line is vertical and, as the air gap increases, the load line swings around toward the horizontal.

It is necessary to optimize the magnetic circuit in order to minimize the cost of the permanent magnets and the size of the machine while at the same time achieving the necessary flux density across the working air gap of the machine. Optimum operating conditions cause a maximum energy storage in the air gap and will occur at a point on the curve where the product of $\beta$ and H is maximum. A permeance coefficient producing a load line passing through this point indicates the optimum ratio of air gap to magnet length. For an alnico magnet this occurs at the knee of curve 80 as indicated by load line 82 intersecting the curve at point 85.

If a permanent magnet is worked at a point much below its region of maximum magnetization it begins to lose its magnetism. When a straight bar permanent magnet is removed from its magnetic circuit, the length of the air gap is somewhat greater than the length of the magnet, a condition represented by load line 83 and point 86 on the demagnetization curve. If the air gap associated with the permanent magnet is thereafter decreased, recovery is along a curve such as 87 which represents a considerable loss of magnetism. Therefore, when using alnico magnets it is necessary to magnetize the permanent magnets after the machine has been completely assembled if a high degree of magnetism is to be achieved.

The assembly method in accordance with this invention requires that a few turns of heavy insulated wire, referred to as a discharge winding, be placed around the individual pole pieces prior to final assembly. For the unitary magnetic structure 3 shown in FIG. 1 this winding 39 passes outside one pole piece 22, through a slot 20, and then inside the next pole piece 21, etc., twice around the unit. This winding in effect surrounds one pole piece in a clockwise direction, and surrounds the adjacent pole piece in the counterclockwise direction, and therefore, current flow through the discharge winding will tend to produce poles of alternating magnetic polarity. A discharge winding 43a is similarly placed surrounding alnico slugs 43 which form the pole pieces of the permanent magnet structure shown in FIG. 3. In FIG. 3 the winding makes a complete loop around one pole piece before passing on to the adjacent pole piece. These discharge windings are held in place with epoxy cement.

After the discharge winding has been secured to the pole piece, the machine is completely assembled so that the air gap associated with the permanent magnet structure is the working air gap of the machine having the armature therein. Next, the winding is connected to a charged bank of electrolytic capacitors (not shown) via a suitable switch. These capacitors store sufficient electrical energy such that when the switch is thereafter closed the capacitors discharge sending a few hundred thousand amperes through the discharge winding for a period of several microseconds. This current flow drives the permanent magnets into a highly saturated state which thereafter leaves the permanent magnet in a fully magnetized state. If the air gap is not thereafter increased, the magnet will retain its fully magnetized state. The discharge winding does not adversely affect the operation of the motor and therefore can be left in place after it has served its purpose.

A barium ferrite permanent magnet presents an entirely different situation as can be noted from curve 81 in FIG. 7. This magnet does not become demagnetized when removed from its magnetic circuit, and hence, there is no critical limit on the air gap length. However, in order to achieve a high flux density within the working air gap of the machine, the length of the air gap must be short compared to the leakage path since the magnetic flux will divide in accordance with the reluctance of the leakage path compared to the reluctance of the path passing through the working air gap. Load line 84 is acceptable for a barium ferrite magnet. The maximum flux density which can be achieved with a barium ferrite permanent magnet is in the range of 2000 to 3000 gauss, and hence, these materials are not suitable for use in high performance machines which require a flux density in excess of 5000 gauss as can be achieved using alnico magnets.

The barium ferrite permanent magnet could be constructed and magnetized in the same fashion as the alnico magnets but, since they do not lose their magnetism when away from their magnetic circuits, it is easier to magnetize the unit prior to final assembly. This is accomplished using a suitably constructed jig having appropriately positioned iron pole pieces surrounded by suitable windings. The barium ferrite ring is placed against the pole faces of the jig and becomes magnetized with a magnetic pattern corresponding to that of the jig when the windings are energized. The barium ferrite ring can thereafter be installed without any significant danger of losing its magnetism.

ARMATURE CONSTRUCTION

The rotating winding of the electrical machines in accordance with this invention includes a large number of radially extending insulating wire segments distributed evenly about an annular area which will be adjacent the stationary magnetic pole faces in the completed machine. These radially extending segments are interconnected to form a continuous winding which is substantially planar, or in other words, is in the form of a relatively thin disc. Successive radially extending segments of the winding are displaced by a distance approximately equal to the distance between pole centers of the associated magnetic structure and are interconnected so that current flowing in the winding will flow in one direction across the stationary magnetic north poles and in the opposite direction across the south poles.

The radially extending segments of the winding are defined as those portions of the winding which will lie within the annular air gap of the stationary magnetic structure, or in other words, the portions of the winding within the annular area of the armature corresponding in diameter to the annular area of the magnetic pole faces. If the radially extending segments are all substantially radial, i.e., each coinciding with a radius of the armature, these segments will lie side by side and not cross within the annular air gap area. This is often desirable since the thickness of this portion of the armature need be no greater than the diameter of the insulated wire forming the armature. However, to facilitate automatic production it may sometimes be desirable to have radially extending segments which are either arcuate or not coincident with a radius. Normally, this will result in some crossing of conductors within the annular air gap area, but the conductors can still be arranged so that the thickness of the armature within the air gap does not exceed twice the diameter of the insulator wire forming the armature.

The portions of the winding which interconnect the radially extending segments and which lie outside the annular air gap area will have a thickness at least twice the diameter of the conductors. As the crossover areas of the armature winding are decreased in width, for example, to reduce the diameter of the armature, additional stacking of conductors occurs, and hence, the thickness of the armature winding in these areas increases. However, the crossover connections, by definition, are not within the working air gap of the machine and therefore this increased thickness is not detrimental to the performance of the machine.

The winding is formed in a continuous fashion utilizing insulating wire. It should be noted that since the conductors are insulated it is possible to cross conductors as desired. Furthermore, the copper distribution can be controlled to achieve a low copper density in the area of the air gap and a denser thicker crossover area outside the air gap. The flexible control over the copper density permits the designer to optimize performance for a particular size armature disc.

A disc-type armature will normally have relatively few armature turns when compared to conventional machines. The back EMF in the case of a motor, and the generated potential in the case of a generator, are functions of the number of armature turns which are connected in series, and therefore, since there are relatively few available turns in a disc-type machine, it is desirable to have the largest possible number of armature turns in series. This is best achieved by utilizing a wave-type armature winding. In a wave winding there are two parallel paths, each path including half of the armature turns connected in series with one another.

An illustrative wave winding is shown in FIG. 8 having 105 armature turns (13 turns per pole plus one turn for closing the winding) and 35 commutator segments (one commutator segment for every three armature turns). An armature turn includes a pair of successive radially extending segments of the winding and, in an eight pole machine, four successive turns make up an armature loop. In the illustrative winding, twenty-six armature loops will complete the winding except for one additional armature turn required for closing the winding.

For purposes of the illustration it can be assumed that the annular air gap for the associated stationary magnetic structure corresponds to the area between the dotted line circles 90 and 91, and hence, the radially extending segments 92 are located between the circles. The outer crossover connections 93 are located outside circle 91 and the inner crossover connections 94 are located inside circle 90. The commutator 95 is centrally located and is in the form of an annulus having thirty-five individual conductive sectors insulated from one another.

The winding begins at a commutator segment 95a which is connected to the first radially extending segment 92a of the winding via an inner crossover connection 94a. This first radially extending segment is coupled to the next successive radially extending segment 92b via an outer crossover connection which includes a portion 93a extending out to the periphery of the armature and a portion 93b connecting directly to the second radially extending segment. The distance between the succession radially extending segments, such as segments 92a and 92b is approximately equal to the distance between pole centers of the associated permanent magnet structure. Radially extending segments 92a and 92b, and the associated crossover connections, comprise the first armature turn. The spacing between each of the successive radially extending segments is always the same and is approximately equal to the distance between magnetic pole centers.

Radially extending segment 92b is coupled to a segment 92c in the second armature turn via an inner crossover connection 94b–c, and segment 92c is connected to segment 92d via an outer crossover connection 93c–d. Likewise, segment 92d is connected to segment 92e in the third armature turn via an inner crossover connection 94d–e and segment 92e in turn is connected to segmet 92f via an outer crossover connection 93e–f. Since the winding is to have a commutator segment connected to every third armature turn, radially extending segment 92f of the winding is connected to a commutator sector 95b via a commutator connection loop 96b before being coupled to the next radially extending segment 92g via crossover connection 94f–g.

Radially extending segment 92g of the fourth armature turn is coupled to segment 92h via outer crossover connection 93g–h, and segment 92h in turn is coupled to a portion of the next inner crossover connection 94h thereby completing the fourth armature turn and the first armature loop. The completed armature loop takes on the appearance of a four bladed propeller, the four blades being the four armature turns each spanning approximately a 90° sector of the armature disc.

The first armature loop ends just short of its beginning. Therefore, if the armature winding continues in the same fashion, the second armature loop 97 is positioned somewhat counterclockwise with respect to the first armature loop. Likewise, each successive armature loop is located counterclockwise with respect to the preceding armature loop. In an eight pole machine, the last armature loop 98 (shown in dotted lines) ends at a point displaced approximately 90° from the beginning of the first armature loop and, therefore, to close the winding one additional armature turn 99 is required to connect the end of the last armature loop to the beginning of the first armature loop.

The designation of armature loops is somewhat arbitrary since the completed winding is continuous and completely symmetrical. The reason that the winding progresses in a counterclockwise direction as it is being wound is that the number of armature turns is not equal to a multiple of the number of poles. For example, to evenly distribute a winding having 105 armature turns, the armature disc area is divided into 105 equal sectors. If successive radially extending segments are displaced approximately by the distance between pole centers, i.e., 13 sectors, then eight such segments will span 104 sectors which is one sector short of a complete revolution. The next set of eight radially extending segments will therefore occupy the sectors adjacent the first set. The winding progresses in this fashion until all sectors are filled and the winding returns to the point where it began. It is apparent therefore that the number of armature turns must differ from a multiple of the number of poles, usually by plus or minus one, if a balanced wave winding is to be achieved.

The number of armature turns is preferably equal to, or a multiple of, the number of commutator segments. This is so that connections to the commutator segments occur at regularly spaced intervals throughout the winding.

For a wave winding there need only be two brushes. These brushes are displaced from one another by the distance between pole centers and are located so that they are always coupled to armature turns located between the magnetic pole faces. Current flow from the positive brush 100 splits and travels through the armature turns in two parallel paths toward the negative brush 101. If additional brushes are employed to reduce the current load per brush, the additional brushes are located at the respective quadrature points and tend to short out a set of armature turns, but since these turns are always located between the magnetic poles there is no significant potential generated therein.

When describing FIG. 8 it was assumed that the stationary magnetic poles would lie in the area between circles 90 and 91. In actual practice, however, this may not be the case as is illustrated in FIG. 9. In the upper portion of the drawing part of an armature winding for an eight pole machine is illustrated having six armature turns per pole. When the machine is in operation and current flows through the winding, the current will flow outwardly toward the periphery of the armature through the conductors 120 shown in solid lines, and will flow toward the center of the armature disc through conductors 121 shown in dotten lines. In the areas 122 and 123 the direction of current flow is predominantly toward the periphery of the armature since the circumferential components of the current flow tend to cancel. Accordingly, the winding in effect produces a sheet of current 124 having a shape approximately as shown wherein the current travels toward the periphery of the armature as indicated by arrow 125. In the adjacent sector of the armature winding a similar sheet of current 126 is developed moving toward the center of the winding as indicated by the dotted lines and the arrow 127.

Torque is produced in a motor in accordance with the interaction between the current flow in the conductors and the stationary magnetic field as is described by Lenz' law. In a disc motor the greatest amount of torque is produced at the periphery of the disc because of the longer moment arm. The magnetic pole faces are therefore located within the areas 124 and 126, preferably as close to the outer periphery of the armature as is feasible. Preferably the insulated wire forming the armature will be distributed to minimize the crossing of conductors within the annular air gap area. The insulated wire in the crossover area outside the annular air gap will be condensed as much as possible to thereby reduce the diameter of the armature disc and to maximize the torque moment arm for the particular disc diameter. Thus, by being able to control the copper distribution and the winding configuration, the designer of the insulated wire wound disc armature is provided with considerable flexibility not previously available.

FIG. 10 illustrates another armature winding for an eight pole machine having approximately six armature turns per pole. This winding is wound with multistrand insulated wire 130. In the annular air gap area between circles 131 and 132 the strands are separated so that they lie substantially side by side in a single plane. This arrangement has the effect of further decreasing the thickness of the armature within the annular air gap area and of more uniformly distributing the winding within the air gap.

FIG. 11 illustrates a continuous lap-wave winding arranged to increase the number of armature turns connected in series within the winding. Characteristically, a wave winding precedes in the same circumferential direction from beginning to end and the distance between successive radially extending segments is always the same. In a lap winding the circumferential direction of the winding alternates and the distance between successive radially extending segments differs so that the successive armature turns will lap one another.

The winding partially shown in FIG. 11 can be traced by beginning with radially extending segment 140a which is connected to the next radially extending segment 140b via an outer crossover connection 141a and segment 140b in turn is connected to the next segment 140c via an inner crossover section 142a. This portion of the winding follows the conventional wave pattern proceeding in a counterclockwise direction. The winding then moves in a clockwise direction with outer crossover connection 141b which connects radially extending segment 140c to the next successive segment 140d. Segment 140d is connected to segment 140c via an inner crossover connection 142e, segment 140e is coupled to 140f via an outer crossover connection 141c, and segment 140f is connected to segment 140h via an inner crossover connection 142c thereby completing two lap turns. The winding next follows the wave pattern through crossover connections 141d and 142d and radially extending segments 140i and 140j. Thereafter the winding completes two lap turns 143 and 144 and then again follows the wave pattern. The winding proceeds in this manner until it returns to the starting point and therefore becomes a closed armature winding when the free ends are connected.

METHOD FOR CONSTRUCTING ARMATURES

The armature is constructed by distributing insulated wire upon a planar surface in continuous fashion. This can be accomplished using a circular jig 149 (FIG. 12) having appropriately positioned pins 150 extending upwardly from the planar surface so that the insulated wires forming the armature can be wound around the pins and thereby appropriately positioned. The pins are located in four concentric rings 151–154. The two intermediate rings 152 and 153 include the positioning pins which define the beginning and end of the radially extending segments 92 of the winding. The inner and outer rings 151 and 154 include the pins which position the crossover portions of the winding interconnecting the radial segments. To simplify the illustration, only a few of the positioning pins are shown in FIG. 12. The positions of pins 150 relative to the winding are also indicated in FIG. 8.

The insulated wire can be distributed directly upon the planar surface of the jig, or upon a disc blank 156 as shown. Holes are drilled or punched into the disc blank corresponding to the positions of the pins 150, and hence, when the blank is dropped into position as shown in FIG. 12, the pins extend upwardly through the blank. The disc blank shown in FIG. 12 includes the commutator segments 157 secured to the disc surrounding a central opening which will accommodate the motor shaft and hub structure. Each commutator segment includes an upwardly extending tab 158, these tabs being used to position the commutator connection loops of the winding. In cases where the winding is formed without a preformed commutator structure, an additional row of positioning pins is added to the jig in place of tabs 158 to position the commutator connection loops.

The winding is started by temporarily looping the wire about one of the tabs such as tab 158a. Thereafter, the wire is unreeled via a suitable tensioning device 159 and passes around the positioning pins in accordance with the desired configuration for the winding. For the wave winding previously referred to in connection with FIG. 8, the winding proceeds from tab 158a around pins 150a and 150b of the inner two rings and then proceeds radially outwardly to form the first radially extending segment 92a. The winding then passes around pins 150c, 150d, and 150e in the outer two rings and thereafter proceeds inwardly to form the second radially extending segment 92b. Thereafter, the winding proceeds around pins 150f, 150g, and 150h in the inner two rings and then forms the next radial segment 92c. The winding proceeds in this fashion forming radial segments 92d, 92e, and 92f to complete three armature turns spanning approximately three-quarters of the disc. Between the third and fourth armature turns, i.e., between radial segments 92f and 92g, the winding is coupled to commutator sector 95b via commutator connection loop 96b. This connection loop is formed by passing the wire around positioning pins 150i and 150j, then looping the wire around tab 158b associated with sector 95b, and by next passing the wire around pins 150k and 150m. Another commutator connection loop is formed after each third armature turn.

The winding continues in this fashion forming successive radialy extending segments each spaced approximately by the distance between pole centers and crossover connections joining these segments lying outside the contemplated air gap area. Eventually the winding will return to tab 158a which signifies the completion of the winding. The wire is then temporarily twisted around tab 158a so that when the wire is subsequently soldered to the tab, the beginning of the winding is connected to the end to form a closed continuous winding.

After the insulated wire has been distributed to form the winding it is necessary to give it structural integrity so that the winding can be mounted on the motor shaft. There is no significant tendency for the magnetic field to deflect the armature winding in an axial direction and therefore the armature need only have sufficient rigidity to maintain clearance with respect to the stationary structure and to transmit torque between the winding and the moor shaft. Structural integrity is achieved by one of the following processes or combinations thereof:

(1) The winding is formed upon the surface of a thermoplastic disc blank 156 as shown in FIG. 12, and when completed, heat and pressure are applied to press the winding into the disc blank. The winding, particularly in the annular air gap area, is embedded in the disc and has a thickness no greater than the insulated wire. This can be done with or without the commutator secured to the disc. The same result can be achieved by forming the winding without the disc balnk and thereafter pressing the thermoplastic disc down upon the preformed winding.

(2) The winding can be laminated between a pair of thermoplastic discs. The winding is preformed and thereafter placed between the laminating discs, or can be wound upon one of the disc blanks as shown in FIG. 12. Preferably, the structure is compressed in the air gap area to minimize the thickness.

(3) The winding can be formed directly upon the circular jig without a disc blank and thereafter coated as by spraying dipping or the like with a suitable dielectric medium to provide structural integrity.

(4) The winding can be formed directly upon the circular jig without a disc blank and thereafter spotted with an adhesive material to bond the insulated wires at points where the conductors cross.

(5) The winding can be formed with a heavy gauge wire which by itself possesses sufficient structural integrity.

COMMUTATOR STRUCTURE

The commutator can be constructed before the winding is formed and can be designed having an array of tabs (see FIG. 12) so that the commutator connection loops can be formed surrounding the tabs. Alternatively, the commutator and the winding can be separably fabricated and thereafter interconnected. The commutator itself can be fabricated in either a disc or cylindrical configuration.

The disc type commutator can be constructed using stamped commutator segments which are separately formed and attached to a disc blank as is illustrated in FIGS. 13, 14 and 15. The individual commutator segment (exclusive of tabs) should take the shape of a sector from an annulus, and hence, can conveniently be punched from a copper blank in the shape of an annulus as is shown in FIG. 13A. However, the desired shape of the commutator segment can easily be simplified by eliminating the curved edges, and hence, shaped as an isosceles trapezoid. This latter configuration lends itself particularly well to stamping the individual segments from a copper strip. The most effective utilization of the copper strip is achieved by alternating the direction of the segments as illustrated in FIG. 13B, but for certain automatic machine installations it may be desirable to have all blanks face the same direction as is illustrated in FIG. 13C.

The commutator segments 179 are each provided with a single tab 180 extending from the narrow end and a pair of tabs 181 and 182 extending from the wider end. Prior to fabrication of the commutator, tabs 180–182 are prebent as shown in FIG. 14. Tab 180 at the narrow end, and one of the tabs 181 at the wide end are bent downwardly at right angles and are used to secure the segment to the dielectric support disc. The remaining tab 182 is bent upwardly and is used for attaching the winding to the commutator segment.

After the segments are formed, tabs 180 and 181 are inserted through suitable holes 184 (see FIG. 15A) appropriately positioned in a dielectric support disc 185 so that the segments will form a flat annular commutator. Tabs 180 and 181 are then bent inwardly to secure the commutator segment to the discs as shown in FIG. 15B except where there is to be a winding on both sides of the support disc, in which case tab 181 can be left extending perpendicular to the disc as shown in FIG. 15C. After the armature winding on the revers side of the disc is attached to tab 181, the tab is bent inwardly to secure the segment to the disc.

After the commutator segments have been attached to the support disc, the insulated wire forming the armature winding can be distributed upon the same disc as was previously described in FIG. 12. With this arrangement the commutator connection loops are formed surrounding the upwardly extending tabs 182 and can thereafter be physically secured to the segments by bending tabs 182 inwardly over the face of the segment as shown in FIGS. 17A and 17B. Accordingly, the wire is held between the tab and the surface of the commutator sector. The insulation can be removed from the wire where it makes contact with the commutator segment and the contact thereafter soldered, or the winding can be formed using a wire with a heat soluble insulation so that the wire can be soldered to the segment without first removing the insulation.

The same technique could be used where the commutator and winding are fabricated separately by positioning the preformed commutator connection loops around tabs 182. However, this is likely to lead to production difficulties if the connection loops are not uniform and accurately aligned. To eliminate this problem the winding configuration can be modified so that the connection loops will lie adjacent the tabs instead of surrounding the tabs. As shown in FIGS. 16A and 16B, the commutator connection loop 187 is then secured to the commutator segment by bending the tab outwardly to trap loop 187 between tab 182 and dielectric support 185. The electrical connection is completed by either using heat soluble insulation on the wire, or stripping the insulation from the wire and then soldering.

The cylindrical commutator for a machine such as shown in FIG. 6 can be constructed as illustrated in FIG. 18. The individual commutator segments 200 have a rectangular configuration with an offset tab 201 extending from one end. The tabs 201 extend through openings drilled or punched in the associated dielectric disc 202. Tabs 201 are disposed in a ring and are available for positioning the commutator connection loops if the winding is formed on disc 202 following the technique illustrated in FIG. 12, or are available for connection to preformed commutator connection loops if the winding is fabricated separately.

A dielectric strip 204 of material such as mica is placed between each adjacent pair of commutator segments. The assembled commutator is mounted on the motor shaft which passes through central opening 205 in the disc. Preferably a dielectric spacer is positioned between the shaft and the commutator.

Another type of commutator suitable for use with disc type machines is illustrated in FIGS. 19 and 20. This commutator is formed on a dielectric disc using printed circuit techniques to form an annular array of individual conductive sectors. The sectors can be formed either by depositing copper in the selected areas until the desired thickness is achieved, or by coating the disc with a uniform layer of copper and etching away the areas between the individual sectors. If desired, holes can be drilled or punched near the periphery of the commutator to facilitate fabrication as shown in FIGS. 20A and 20B.

METHOD OF CONSTRUCTING ARMATURE WITH COMMUTATOR

The commutator segments are connected to the winding by means of commutator connection loops which are formed as part of the winding as previously described with respect to FIGS. 8 and 12. The number of connection loops is equal to the number of commutator segments. The number of armature turns is preferably equal to the number of commutator segments, or a multiple thereof, so that the commutator connections will occur at regularly spaced intervals throughout the winding.

The commutator connections can be made by using leads connecting to the appropriate points on the winding, but the use of connection loops is desirable since the connection loops can be formed as the armature is wound in a single continuous process. If a preformed commutator is employed having tabs such as illustrated in FIGS. 15A and 18, the connection loops are formed surrounding the tabs as has been previously described. If instead, a printed circuit disc commutator is employed as shown in FIG. 20B having apertures 250 in the commutator segments, the commutator connection loops 251 of the winding 252 are similarly formed during the winding process by pushing the ends of the loops into the apertures. With either process, after the winding is completed the connection loops are soldered to the segments. The insulation can be stripped from the connection loops during or after winding, or wire having a heat soluble insulation can be employed.

An alternative approach is to separately fabricate the winding and commutator. The winding is formed in the manner previously described (FIG. 12) using an additional row of positioning pins to replace the commutator segment tabs. The completed winding appears as shown in FIG. 19A with the individual commutator connection loops 220 extending from the inner periphery of the armature winding 221. If the insulated wire in the winding is not heat soluble, insulation is stripped from the loops to expose the bare copper. The associated commutator shown in FIG. 19 is of the printed circuit type having individual commutator sectors 222 mounted on a dielectric disc 223. The winding is aligned so that the edges of the connection loops overlie the outer edges of the commutator segments in the relative positions shown in FIG. 19A.

The armature winding is then secured to the commutator structure by soldering the connection loops to the commutator segments. This can be accomplished in a single operation using a soldering tool 225 having an annular ring 226 heated by a heat source 227. The outside diameter must be sufficient to cover at least part of each connection loop, but not large enough to touch the inner crossover connections of the winding. The completed armature structure appears as shown in FIG. 19B with solder 226 electrically and physically securing the connection loops to the commutator segments.

To obtain a better physical connection between the winding and commutator, the connection loops can be bent to form downwardly extending portions 230 as shown in FIG. 20A. These downwardly extending portions are arranged to pass through suitable holes 231 located near the outer edges of the commutator segments. The assembled structure would appear as shown in FIG. 20B. The connection loops can then be soldered to the commutator segments in the manner illustrated in FIGS. 19A and 19B.

Commutators of the types illustrated in FIG. 15A can also be secured to the armature winding after it is formed. The upwardly extending tabs 182 (FIG. 15A) could simply be eliminated and the winding attached in the manner illustrated in FIGS. 19A and 19B i.e. attached directly to the commutator segments. Alternatively, the preformed connection loops can be placed surrounding tabs 182 which are then bent inwardly as shown in FIGS. 17A and 17B, or the connection loops can be placed outside the annular array of tabs and secured to the commutator by bending the tabs outwardly as shown in FIGS. 16A and 16B. The segments of the cylindrical commutator shown in FIG. 18 can similarly be secured to the winding by bending the tabs or by eliminating the tabs and securing the winding in the manner illustrated in FIGS. 19A and 19B.

While only a few illustrative embodiments of the invention have been described in detail it should be obvious that there are numerous variations and modifications within the scope of this invention. The invention is more particularly defined in the appended claims.

What is claimed is:

1. A method of constructing an armature for a disc-type electrical machine having a stationary magnetic pole structure, comprising
   distributing insulated wire on to a substantially planar surface in a continuous fashion by means of a wire dispensing device automatically controlled to follow a predetermined path relative to the surface,
   to form successive pairs of radially extending segments substantially on the plane,
   each successive segment along the continuous insulated wire being approximately equally spaced from its adjacent segments and separated by a distance approximately the same as that between adjacent pole centers of the associated magnetic pole structure, and
   to form crossover connections interconnecting said radially extending segments, and
disposed in an area to be located outside said working air gap;
continuing the distribution of said insulated wire until the desired number of radially extending segments have been formed, and until the winding returns to the starting point, thereby completing the winding; and
joining the beginning of said winding to the end of the same to form a closed armature winding.

2. The method in accordance with claim 1 wherein structural integrity is added to said armature winding so that torque can be transmitted to and from the same
by distributing said insulated wire upon a dielectric disc, and
by thereafter bonding at least said radially extending segments to said dielectric disc.

3. The method in accordance with claim 1 wherein structural integrity is added to said armature winding so that torque can be transmitted to and from the same by bonding at least said radically extending segments of the winding between a pair of dielectric discs.

4. The method in accordance with claim 1 wherein structural integrity is added to said armature winding so that torque can be transmitted to and from the same by coating at least a portion of said armature winding with a dielectric material.

5. The method in accordance with claim 1 wherein said crossover connections are secured to each other to provide structural integrity so that torque can be transmitted to and from said winding.

6. The method in accordance with claim 1 wherein said insulated wire is sufficiently rigid to provide structural integrity required for said armature winding so that torque can be transmitted to and from the same.

7. A method of constructing a wire wound armature for a disc-type machine having a stationary magnetic pole structure, comprising
distributing a continuous insulated wire upon one side of a dielectric disc by means of a wire dispensing device automatically controlled to follow a predetermined path relative to the dielectric disc to form an armature winding having
a plurality of radially extending segments disposed in an annular array to be located within the working air gap adjacent the magnetic pole structure, and
a plurality of crossover connections to be located outside said working air gap for interconnecting said radially extending segments;
thereafter applying heat and pressure to at least said radially extending segments to bond the same to said dielectric disc and thereby fix the winding configuration and add structural integrity to the armature winding; and
mounting said disc on the motor shaft so that torque can be transmitted between said armature winding and said shaft.

8. A method of constructing a wire wound armature for a disc-type machine having a stationary magnetic pole structure, comprising
distributing a continuous insulated wire upon a planar surface of a winding jig by means of a wire dispensing device automatically controlled to follow a predetermined path relative to said planar surface to form an armature winding having
a plurality of radially extending segments disposed in an annular array to be located within the working air gap adjacent the magnetic pole structure, and
a plurality of crossover connections to be located outside said air gap for interconnecting said radially extending segments;
thereafter fixing the positions of said radially extending segments of said armature winding with a medium to provide structural integrity to the winding,
removing the armature from the winding jig after the positions of said radially extending segments have been fixed, and
mounting the armature winding on a motor shaft so that torque can be transmitted between said armature winding and said shaft.

9. A method of constructing an armature for a disc-type electrical machine having a stationary magnetic pole structure, comprising
distributing insulated wire onto a substantially planar surface in a continuous fashion by means of a wire dispensing device automatically controlled to follow a predetermined path relative to the surface
to form successive pairs of radially extending segments substantially on the plane,
each successive segment along the insulated wire being substantially equally spaced from its adjacent segments and separated by a distance approximately the same as that between pole centers of the associated magnetic pole structure, and
disposed in an annular array to be located within the air gap adjacent the magnetic pole structure, and
to form crossover connections
interconnecting said radially extending segments in a balanced fashion with one pair of successive radially extending segments connected as a wave winding followed by at least one pair of successive radially extending segments connected as a lap winding, and
disposed outside said air gap;
continuing the distribution of said insulated wire
until the desired number of radially extending segments have been formed, and
until the winding returns to the starting point, thereby completing the winding,
joining the beginning of said winding to the end of the same to form a closed armature winding.

10. A method of forming an armature winding for a disc-type electrical machine having a stationary magnetic pole structure, comprising
constructing a winding jig in the form of a disc having at least inner and outer concentric rows of positioning pins extending therefrom,
the annular area between said rows corresponding to the portion of the winding to be located adjacent the magnetic pole structure,
the number of pins in each row being equal to an integer differing by one from a multiple of the number of poles in the magnetic pole structure;
distributing insulated wire on said jig around said positioning pins in a continuous fashion in accordance with the following sequence:
moving radially from a pin in the inner row to a pin in the outer row,
then moving circumferentially to a pin in the outer row approximately displaced by the distance between pole centers of the magnetic pole structure,
then moving radially from a pin in said outer row to a pin in said inner row,
then moving circumferentially to another pin in the inner row approximately displaced by the distance between pole centers,
then again moving radially from a pin in the inner row to a pin in the outer row;
continuing in said sequence until reaching the beginning of said winding, and
joining the beginning to the end of the winding to form a closed armature winding.

11. The method in accordance with claim 10 wherein a closed wave winding is formed by always moving circumferentially in the same direction.

12. The method in accordance with claim 10 wherein a closed lap winding is formed by alternating the direction of said circumferential movements.

13. The method in accordance with claim 10 wherein a composite lap and wave winding is formed by periodically reversing the direction of said circumferential movements.

14. The method in accordance with claim 10 wherein said jig further includes a third row of pins located outside said annular area and a fourth row of pins located inside said annular area, and wherein circumferential movements between pins in said outer row pass around a pin in said third row, and circumferential movements between pins in said inner row pass around a pin in said fourth row.

15. The method according to claim 7 wherein a second dielectric disc is added on the side of the armature winding opposite to that of the dielectric disc upon which the armature winding is formed, heat and pressure being thereafter applied to bond at least said radially extending segments between the dielectric discs.

16. The method according to claim 1 wherein the winding is formed by distributing multistrand insulated wire with the strand making up said radially extending segments lying side by side substantially within a plane.

17. A method of forming an armature winding for a disc-type electrical machine having a stationary magnetic pole structure, comprising
constructing a winding jig in the form of a disc having at least inner and outer concentric rows of positioning pins extending therefrom,
the annular area between said rows corresponding to the portion of the winding to be located adjacent the magnetic pole structure,
the number of pins in said rows being equal;
distributing insulated wire on said jig around said positioning pins in a continuous fashion in accordance with the following sequence:
moving outwardly from a pin in the inner row to a pin in the outer row,
then moving circumferentially around the pin in the outer row,
then moving inwardly from a pin in said outer row to a pin in said inner row,
successive outwardly and inwardly extending wire portions being approximately displaced by the distance between pole centers of the magnetic pole structure,
then moving circumferentially to another pin in the inner row approximately displaced by the distance between pole centers,
then again moving radially from a pin in the inner row to a pin in the outer row;
continuing in said sequence until reaching the beginning of said winding, and
joining the beginning to the end of the widing to form a closed armature winding.

18. The method according to claim 17 wherein said winding jig is constructed further including an additional concentric row outside said outer row and wherein said insulated wire is distributed passing circumferentially around a pin in said additional row after passing around a pin in said outer row.

References Cited

UNITED STATES PATENTS

| | | | |
|---|---|---|---|
| 229,191 | 6/1880 | Seeley | 310—268 |
| 295,534 | 3/1884 | Frick | 310—268 |
| 333,174 | 12/1885 | Thomson | 310—268 |
| 386,775 | 7/1888 | Fritsche | 310—268 |
| 534,953 | 2/1895 | Eickemeyer | 310—268 X |
| 1,739,246 | 12/1929 | Majce. | |
| 2,779,882 | 1/1957 | Ishikawa | 310—268 X |
| 2,982,889 | 5/1961 | Whearley | 29—605 X |
| 3,095,516 | 6/1963 | Moressee et al. | 310—268 |
| 3,293,466 | 12/1966 | Henry-Bandot | 310—268 X |
| 3,382,570 | 5/1968 | Knapp et al. | 29—598 |

JOHN F. CAMPBELL, Primary Examiner

C. E. HALL, Assistant Examiner

U.S. Cl. X.R.

29—605; 310—268